Nov. 6, 1928.

C. M. BRACK 1,690,922

ROTARY SPIRAL PLOW

Filed Nov. 12, 1927        2 Sheets-Sheet 1

INVENTOR.
C. M. Brack,
BY
Geo. P. Kimmel
ATTORNEY.

Nov. 6, 1928.
C. M. BRACK
1,690,922
ROTARY SPIRAL PLOW
Filed Nov. 12, 1927  2 Sheets-Sheet 2
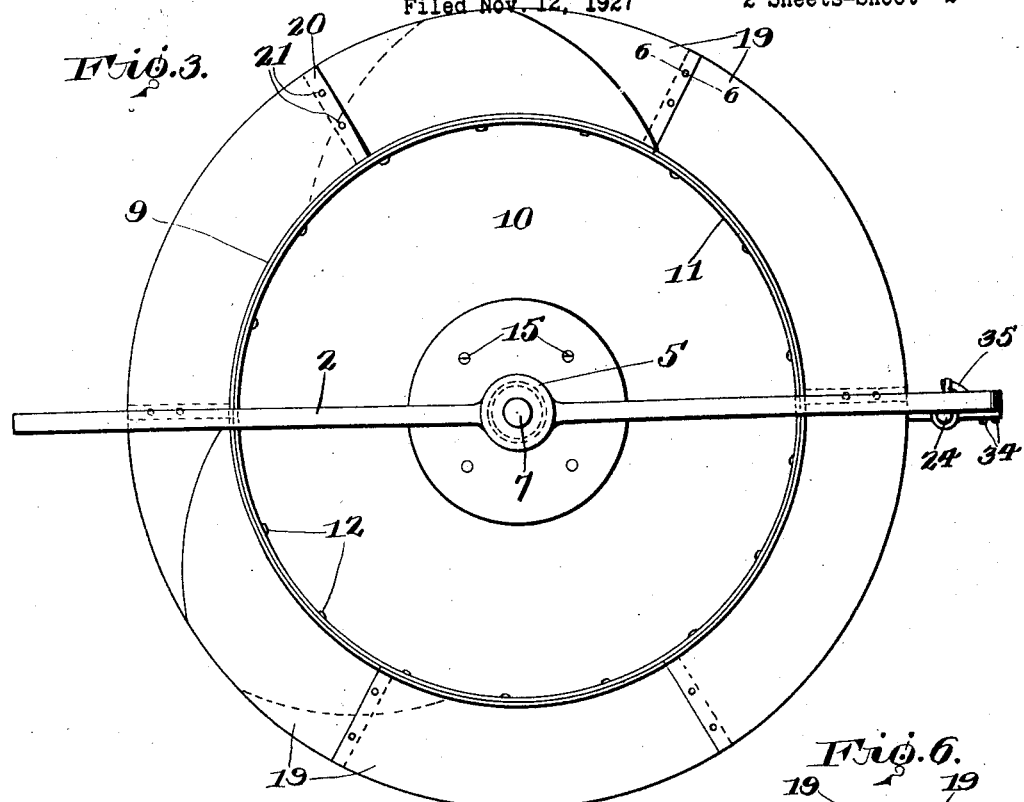
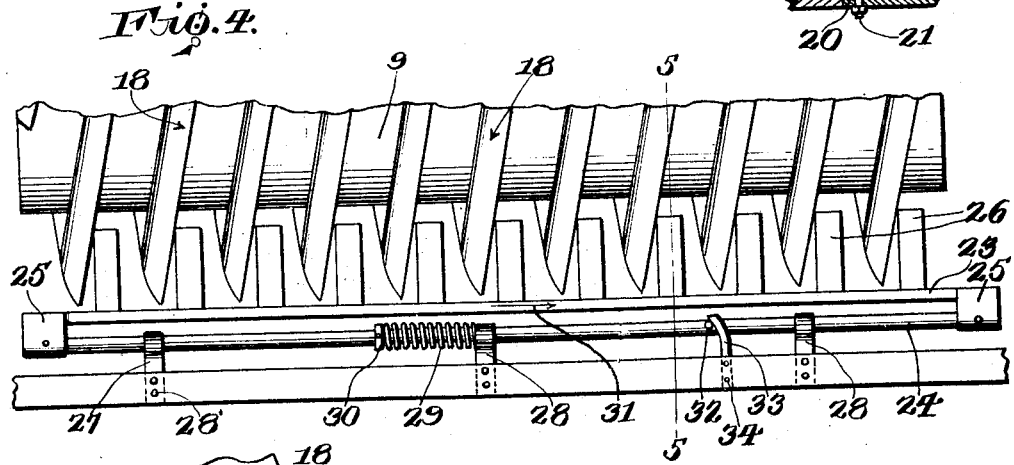
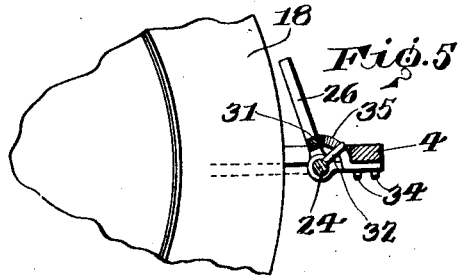
INVENTOR.
C. M. Brack,
BY Geo. F. Kimmel
ATTORNEY.

Patented Nov. 6, 1928.

1,690,922

UNITED STATES PATENT OFFICE.

CONRAD M. BRACK, OF GREAT BEND, KANSAS.

REISSUED

ROTARY SPIRAL PLOW.

Application filed November 12, 1927. Serial No. 232,887.

This invention relates to a rotary spiral plow and has for its object to provide, in a manner as hereinafter set forth, a plow of such class including a rotatable cylinder having one or more plow elements helically disposed throughout the periphery thereof and with the plow share element constructed in a manner to provide for a thoroughly efficient working or cutting of the ground during the travel of the plow.

A further object of the invention is to provide, in a manner as hereinafter set forth, a rotary plow including one or more helically disposed plow share elements, and further including a combined reciprocatory and oscillatory spring controlled means intermittently engaging with the plow share elements for cleaning them in a satisfactory manner during the travel of the plow.

Further objects of the invention are to provide, in a manner as hereinafter set forth, a rotary plow which is comparatively simple in its construction and arrangement, strong, durable, compact, thoroughly efficient in its use, conveniently assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a side elevation of the plow.

Figure 4 is a fragmentary view in plan and upon an enlarged scale showing the arrangement of the cleaner device with respect to the share elements.

Figure 5 is a section on line 5—5 Figure 4.

Figure 6 is a fragmentary view, in section, illustrating the lap joint between a pair of plow share members or sections.

Figure 1:
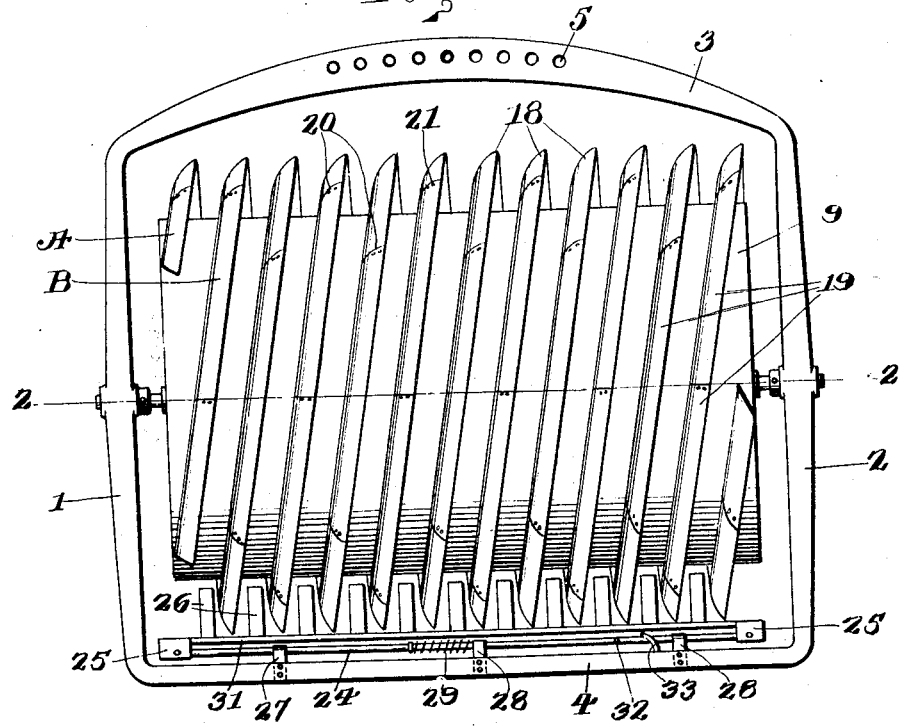
Figure 1 is a top plan view of a rotary plow in accordance with this invention.

A rotary plow, in accordance with this invention, includes a horizontally disposed rectangular frame having the side bars thereof indicated at 1, 2, the front bar at 3 and the rear bar at 4. The front bar 3 projects forwardly and is of arcuate shape. The front bar 3 is provided with a series of spaced openings 5 for adjustably connecting a hitch thereto. Each side bar is provided centrally thereof with an enlarged portion 5' formed with a central transversely extending opening 6. The enlarged portions 5' form bearings for a shaft 7, carrying stop collars 8 which are positioned within the frame and arrest lengthwise shifting of the shaft 7, or in other words the collars 8 act to maintain the shaft 7 in set position with respect to the frame.

Bodily carried with the shaft 7 is a cylinder or drum of appropriate diameter and of a length less than the distance from one side bar to the other side bar of the frame. The cylinder rotates with the shaft 7 and comprises a hollow body portion 9, closed at each end by a flanged head 10. The flanges of the heads 10 are indicated at 11, and holdfast devices 12 are employed for securing the heads 10 within the body portion 9 at the ends thereof. Each head 10 is formed with an axial opening 13 for the passage of the shaft 7 and secured to the outer face of each head 10, centrally thereof, is a flanged casting 14. The flange of the casting 14 is indicated at 14' and it is fixedly secured to a head by the holdfast devices 15. Each casting 14 is formed with an axial opening 16 which registers with an opening 13. The casting is fixedly secured to the shaft 7 by a diametrically extending rivet or pin 17.

Disposed throughout the outer periphery of the body portion 9 is a plurality of helical plow share elements, preferably two and indicated generally at 18. Each element 18 is formed of a series of share members or sections 19 of like construction.

Figure 2:
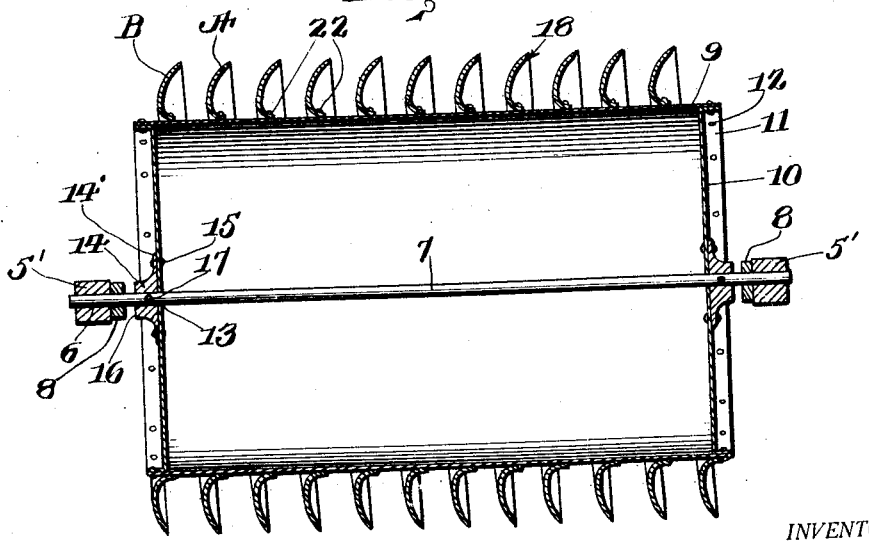
Figure 2 is a longitudinal sectional view of the cylinder carrying the share element.

The members or sections 19 of each element 18 have a lap joint connection therebetween, as shown in Figure 6. The opposed ends of said members or sections 19 are rabbeted as at 20, arranged in overlapping positions, and detachably connected together by the holdfast devices 21. Each share member or section 19 is of substantially concavo-convex transverse section. See Figure 2. Each share member or section 19 is detachably connected at its inner side, against the outer periphery of the cylinder, by the holdfast devices 22.

Carried by the rear bar 4 of the frame and projecting forwardly therefrom is a combined reciprocatory and oscillatory spring controlled means which is adapted to intermittently engage with the plow share element or elements for cleaning it or them in a satisfactory manner during the travel of the plow. The said cleaning means comprises a pair of spaced, parallel bars 23, 24 and with the former arranged forwardly of the latter. The bars 23, 24 are connected together at their ends by the coupling devices 25. The bar 24 is arranged forwardly of the rear bar 4 of the frame, arranged in parallelism with respect thereto, and spaced therefrom. The bar 23 is of square cross section and the bar 24 of cylindrical cross section. Secured to and extended forwardly from the bar 23 is a series of spaced cleaner members 26 for bearing against the plow share element or elements. The bar 24 is slidably supported by a series of apertured, forwardly directed supporting members 27 arranged in spaced relation, and fixedly secured to the rear bar 4 of the frame, by the holdfast devices 28. The number of supporting members is three and carried by the bar 24 and bearing against the central supporting member 28 is a coiled controlling spring 29, confined on the bar 24 between a collar 30 and said central supporting member. The spring 29 functions to maintain the bars 23, 24 and cleaner member 26 in the position shown in Figure 1. The bars 23, 24 are shifted in the direction of the arrow 31, against the action of the controlling spring 29, by the coils of the plow share element or elements. The bar 24 is provided with a stud 32, which rides against a cam piece 33 extending forwardly from the rear bar 4 of the frame. The cam piece 33 is secured to the rear bar 4 by the holdfast devices 34. The cam piece 34 includes an upstanding arcuate part 35 arranged forwardly of the bar 4 and provides means for moving the bars 23, 24, in an upward direction when said bars move in the direction of the arrow 31, and after the cleaner members 26 pass clear of the coils of the plow share element or elements, the spring 29 acts to restore the cleaning means to normal position and the lowering of the bars 23, 24. The reciprocatory movement of the cleaning means is had through the medium of the spring 29 and the cleaning member 26, in connection with the coils of the plow share element or elements and the oscillatory movement of the cleaning means is had through the medium of the pin 24, cam 33 and spring 29. The movement of the cleaning means in one direction, during its oscillatory movement, is caused by the pin 32 and cam piece 33 and the movement in the opposite direction is arrested by gravity. The construction and arrangement of the cleaning devices provides for the intermittent engagement thereof with the coils of the plow share element or elements.

In Figure 1 one of the sectional plow share elements is indicated at A and the other at B. It is to be understood that a single plow share element can be employed or as many as desired. When one plow share element is employed the inclination of the coils will be greater than if a plurality of plow share elements were employed.

The cleaning members 26 operate in the grooves formed between the coils of and are not in permanent engagement with the plow share elements, but are shifted to intermittently engage therewith for the purpose of cleaning the same.

It is thought the many advantages of a rotary plow, in accordance with this invention can be readily understood, and although the preferred embodiment of the invention is as illustrated and described, yet it is to be understood that changes in the details of construction can be had which will fall within the scope of the invention as claimed.

What I claim is:

1. A rotary plow comprising a rotatable cylinder provided on its periphery with spaced helically arranged plow share sections, and a combined reciprocatory and oscillatory cleaning means intermittently engaging with said sections during the rotation of the cylinder.

2. A rotary plow comprising a rotatable cylinder provided on its periphery with helically arranged plow share sections of concavo-convex cross section arranged in spaced relation, and a combined reciprocatory and oscillatory cleaning means intermittently positioned between and engaging with said sections for cleaning the same during the rotation of the cylinder.

3. A rotary plow comprising a frame, a rotatable cylinder carried thereby and provided on its periphery with helically arranged plow share sections of concavo-convex cross section, and a combined reciprocatory and oscillatory cleaning means carried by the rear bar of said frame and intermittently extending between said sections for cleaning the latter during the rotation of the cylinder.

4. A rotary plow comprising a frame, a rotatable cylinder carried thereby and arranged therein, helically arranged plow share sections secured to the periphery of said cylinder, of concavo-convex cross section and arranged in spaced relation, and a combined reciprocatory and oscillatory cleaning means carried by the rear bar of said frame and intermittently extending between said sections and cleaning the same during the rotation of the cylinder.

In testimony whereof, I affix my signature hereto.

CONRAD M. BRACK.